United States Patent
Kim et al.

(10) Patent No.: US 9,555,760 B2
(45) Date of Patent: Jan. 31, 2017

(54) SAFETY APPARATUS FOR VEHICLE

(71) Applicant: AUTOLIV DEVELOPMENT AB, Vargarda (SE)

(72) Inventors: Do Gwan Kim, Hwaseong-si (KR); Doo Seob Jung, Bucheon-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/436,128

(22) PCT Filed: Nov. 22, 2013

(86) PCT No.: PCT/KR2013/010657
§ 371 (c)(1),
(2) Date: Apr. 16, 2015

(87) PCT Pub. No.: WO2014/084552
PCT Pub. Date: Jun. 5, 2014

(65) Prior Publication Data
US 2015/0291120 A1    Oct. 15, 2015

(30) Foreign Application Priority Data

Nov. 29, 2012    (KR) .................... 10-2012-0137179

(51) Int. Cl.
*B60R 21/206* (2011.01)
*B60R 21/215* (2011.01)
*B62D 25/14* (2006.01)

(52) U.S. Cl.
CPC ........... *B60R 21/206* (2013.01); *B60R 21/215* (2013.01); *B62D 25/145* (2013.01); *B60R 2021/21506* (2013.01)

(58) Field of Classification Search
CPC ................ B60R 21/206; B60R 21/215; B60R 2021/21506; B62D 25/145
See application file for complete search history.

(56) References Cited

U.S. PATENT DOCUMENTS 3,797,855 A  *  3/1974  Wright, Jr. ............ B60R 21/233
                                                        182/137
4,427,215 A  *  1/1984  Weichenrieder ...... B60R 21/045
                                                        180/90

(Continued)

FOREIGN PATENT DOCUMENTS

JP        2003-205814 A        7/2003
WO    WO-2005-054014 A1    6/2005

OTHER PUBLICATIONS

International Search Report for PCT/KR2013/010657, ISA/KR, Daejeon Metropolitan City, mailed Mar. 20, 2014.

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A safety apparatus for a vehicle includes a coupling device to couple an airbag device with a cowl cross bar. The coupling device includes a plurality of mounting brackets coupled with the cowl cross bar while being spaced apart from each other by a predetermined distance, mounting blocks coupled with the mounting brackets, and fitting members protruding from an outer bottom surface of the housing and fitted on the mounting blocks.

20 Claims, 9 Drawing Sheets

(56) References Cited

U.S. PATENT DOCUMENTS

| | | | | |
|---|---|---|---|---|
| 5,190,314 A * | 3/1993 | Takasugi | B60R 7/06 | 280/730.1 |
| 5,275,456 A * | 1/1994 | Ishii | B60R 7/06 | 16/85 |
| 5,482,319 A * | 1/1996 | Yoshimura | B60R 21/045 | 280/752 |
| 5,570,901 A * | 11/1996 | Fyrainer | B60R 21/2032 | 280/730.1 |
| 5,718,453 A | 2/1998 | Kassel et al. | | |
| 6,010,146 A | 1/2000 | Otsuka et al. | | |
| 6,131,950 A * | 10/2000 | Schroter | B60R 21/205 | 280/730.1 |
| 6,302,437 B1 | 10/2001 | Marriott | B60R 21/20 | 280/728.3 |
| 7,029,026 B2 * | 4/2006 | Morita | B60R 21/045 | 280/728.3 |
| 7,144,033 B2 * | 12/2006 | Seo | B60R 21/205 | 280/728.2 |
| 7,147,247 B2 * | 12/2006 | Hayakawa | B60R 21/206 | 280/740 |
| 7,261,318 B2 * | 8/2007 | Enders | B60R 21/206 | 280/732 |
| 7,293,795 B2 * | 11/2007 | Kong | B60H 1/00507 | 280/728.3 |
| 7,478,832 B2 * | 1/2009 | Kong | B60R 21/04 | 280/748 |
| 8,056,922 B2 * | 11/2011 | Mitsuo | B60R 21/2032 | 280/728.2 |
| 8,333,407 B2 * | 12/2012 | An | B60R 21/045 | 280/751 |
| 8,444,177 B2 * | 5/2013 | Wallat | B60R 21/206 | 280/728.3 |
| 8,840,142 B2 * | 9/2014 | Fujiwara | B60R 21/045 | 280/748 |
| 2005/0048904 A1 * | 3/2005 | Lee | B60H 1/0055 | 454/127 |
| 2005/0080605 A1 * | 4/2005 | Kong | B60R 21/2165 | 703/8 |
| 2005/0116449 A1 | 6/2005 | Enders | | |
| 2005/0121890 A1 | 6/2005 | Kong | | |
| 2005/0140120 A1 | 6/2005 | Seo | | |
| 2011/0115200 A1 * | 5/2011 | Choi | B60R 21/205 | 280/728.2 |
| 2012/0217728 A1 | 8/2012 | Jackson et al. | | |

* cited by examiner

SAFETY APPARATUS FOR VEHICLE

CROSS-REFERENCE TO RELATED APPLICATIONS

This application is a 371 U.S. National Stage of International Application No. PCT/KR2013/010657, filed Nov. 22, 2013. This application claims priority to Korean Patent Application No. 10-2012-0137179, filed Nov. 29, 2012. The entire disclosures of each of the above applications are incorporated herein by reference.

TECHNICAL FIELD

The present invention relates to a safety apparatus for a vehicle, in which an airbag device coupled with a cowl cross bar provided in the width direction of the vehicle has an improved coupling structure.

BACKGROUND ART

In general, an airbag device is a safety device installed inside a vehicle to protect an occupant when external impact is applied to the vehicle. The airbag device is installed at the central portion of a steering wheel provided at the side of a driver seat or installed at an instrument panel provided at the side of a passenger seat to protect an upper body of an occupant. Alternatively, the airbag device is variously installed at a door of the vehicle or at a lower portion of the instrument panel to protect each part of a human body such as a side, knees, or a lower body of the passenger.

When the airbag device is installed at the lower portion of the instrument panel of the vehicle or installed in the instrument panel, the airbag device is coupled with a cowl cross bar provided in the width direction of the vehicle by using an additional mounting bracket.

Patent document 1: Japanese unexamined patent publication No. 2003-205814

Patent document 2: U.S. Patent Application Publication No. 2012/0217728.

The airbag device according to the related art has a problem in that a coupling work of coupling the airbag device with the cowl cross bar through the mounting bracket is complex. In other words, according to the related art, one end of the mounting bracket is coupled with the cowl cross bar, and an opposite end of the mounting bracket is brought into contact with a housing bracket provided in an airbag housing and coupled with the airbag housing by using a coupling member.

In this case, in the state that a worker brings the housing bracket, which is provided in the airbag housing, into contact with the mounting bracket, the worker must grasp the airbag housing with one hand and couple the coupling member.

In addition, since the mounting bracket according to the related art has an unstable support structure, the airbag device may be moved when an airbag is inflated at the high pressure, so that the airbag may not be deployed to a right position thereof.

Further, since the mounting bracket according to the related art has no strong support structure, the mounting bracket may cause noise, vibration, and harshness (NVH).

Since the mounting bracket according to the related art has an unstable structure, the instrument panel may be deformed or broken when the airbag is deployed.

DISCLOSURE OF INVENTION

Technical Problem

The present invention has been made to solve the problems occurring in the prior art, and an object of the present invention is to provide a safety apparatus for a vehicle, in which an airbag device can be easily coupled with a cowl cross bar by improving a coupling device for the airbag device.

Another object of the present invention is to provide a safety apparatus for a vehicle, capable of stably deploying an airbag by improving a coupling device for an airbag device.

Still another object of the present invention is to provide a safety apparatus for a vehicle, capable of reducing noise, vibration, and harshness (NVH) by improving a coupling device for an airbag device.

Yet another object of the present invention is to provide a safety apparatus for a vehicle, capable of preventing an instrument panel from being deformed or broken when an airbag is deployed by improving the structure of a coupling device for an airbag device.

Solution to Problem

In order to accomplish the object of the present invention, there is provided a safety apparatus for a vehicle including an airbag device comprising a housing having one open side to receive a folded airbag, an inflator provided in the housing to supply inflation gas to the airbag, and a cover to close the open side of the housing, and a coupling device coupling the airbag device to a cowl cross bar installed in a width direction of a vehicle such that the cover is directed to the knee of an occupant. The coupling device includes a plurality of mounting brackets coupled with the cowl cross bar while being spaced apart from each other by a predetermined distance, mounting blocks coupled with the mounting brackets, and support members protruding on an outer floor of the housing and supported on the mounting blocks.

The support members may include fitting members fitted on the mounting blocks.

The mounting blocks may be coupled with inner portions of the mounting brackets while facing each other. The fitting members may be positioned corresponding to the mounting blocks, and lower portions of the fitting members and side portions of the fitting members provided in parallel to both lengthwise lateral sides of the housing may be opened.

Each mounting block may be provided on a top surface thereof with a protrusion, and each fitting member may be provided in a top surface thereof with a through hole fitted around the protrusion.

At least one lateral side of each mounting block may become inclined in a upper direction while facing an inner portion of the mounting block, and an inner lateral side of each fitting member corresponding to the at least one lateral side of the mounting block may become inclined in an upper direction of the fitting member while facing an inner portion of the fitting member.

Each fitting member and each mounting block may be configured such that a predetermined interval is maintained between an inner surface of the fitting member and an outer surface of the mounting block.

The protrusion of the mounting block may include a bolt, the through hole of the fitting member may be fitted around the protrusion, and then a nut may be coupled with the bolt.

Each fitting member may be injection-molded such that the fitting member is integrally formed with the housing.

The airbag device may be provided in an opening of a low instrument panel positioned under a steering column provided at a side of a driver seat of the vehicle.

The airbag device may be provided in an opening of an upper instrument panel provided at a side of a passenger seat of the vehicle.

Advantageous Effects of Invention

As described above, according to the safety apparatus for the vehicle of one embodiment of the present invention, the coupling device for the airbag device is improved to a fitting scheme, thereby easily coupling the airbag device to the cowl cross bar.

According to the safety apparatus for the vehicle of one embodiment of the present invention, as the airbag device is firmly supported by the coupling device so that the airbag device is prevented from being moved, the airbag can be stably deployed.

According to the safety apparatus for the vehicle of one embodiment of the present invention, as the airbag device is firmly supported by the coupling device, noise, vibration, and harshness (NVH) can be reduced.

According to the safety apparatus for the vehicle of one embodiment of the present invention, as the airbag device is firmly supported by the coupling device, the instrument panel can be prevented from being deformed or broken.

MODE FOR THE INVENTION

Figure 1:
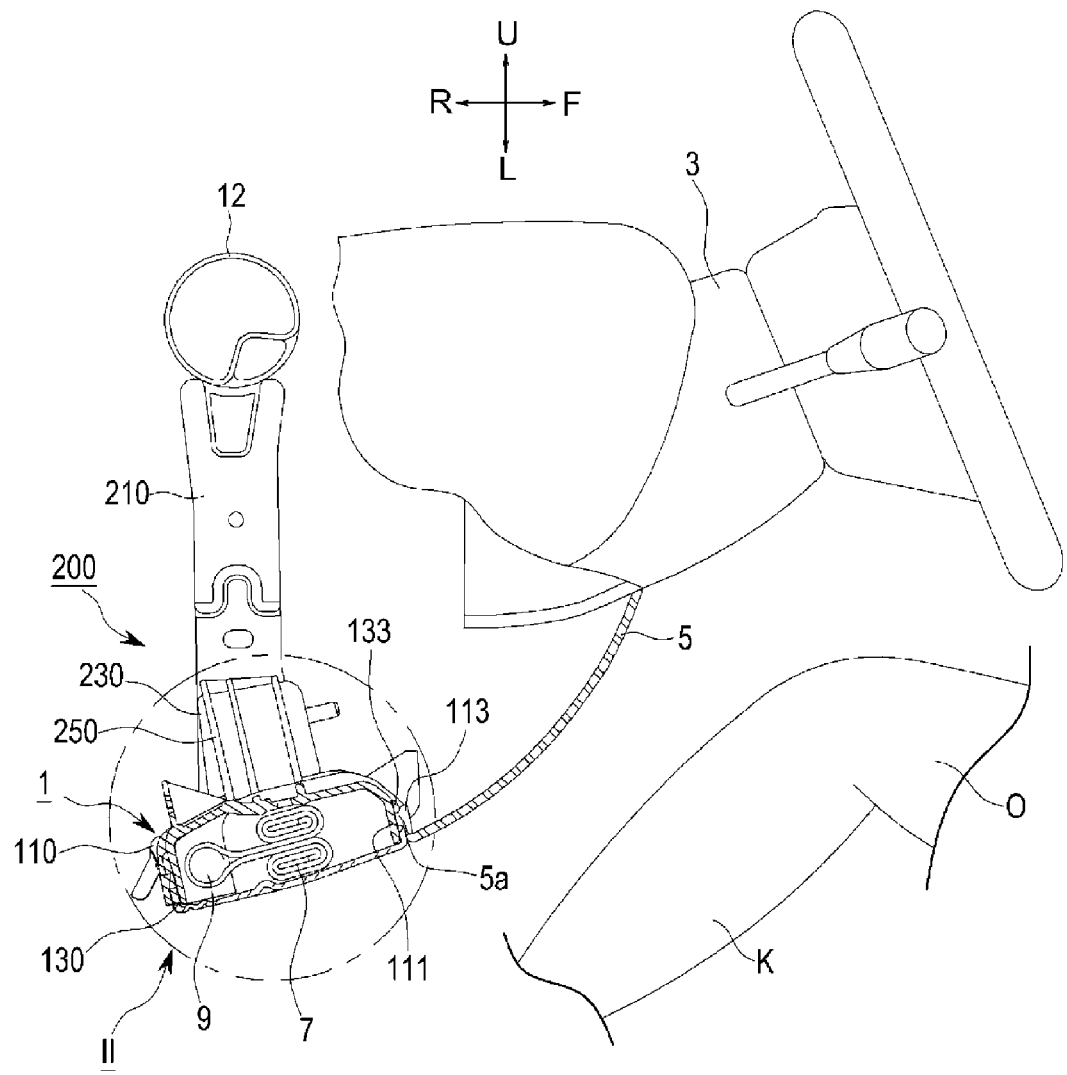
FIG. 1 is a sectional view schematically showing an airbag housing assembly according to one embodiment of the present invention applied to a knee-protection airbag device provided at the side of a driver seat.

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

Hereinafter, "upper", "lower", "forward", "rearward", and other directional terms will be defined based on an airbag housing in the state that the airbag housing is coupled to a lower portion of an instrument panel. That is, a direction of facing a ceiling of a vehicle is defined as an upper direction (U), a direction of facing a bottom of the vehicle is defined as a lower direction (L), a direction of facing a passenger side is defined as a forward direction (F), and a direction of facing a front side of the vehicle is defined as a rearward direction (R).

The same components will be assigned with the same reference numerals, and the repetition in the description about the same components will be omitted in order to avoid redundancy.

Figure 2:
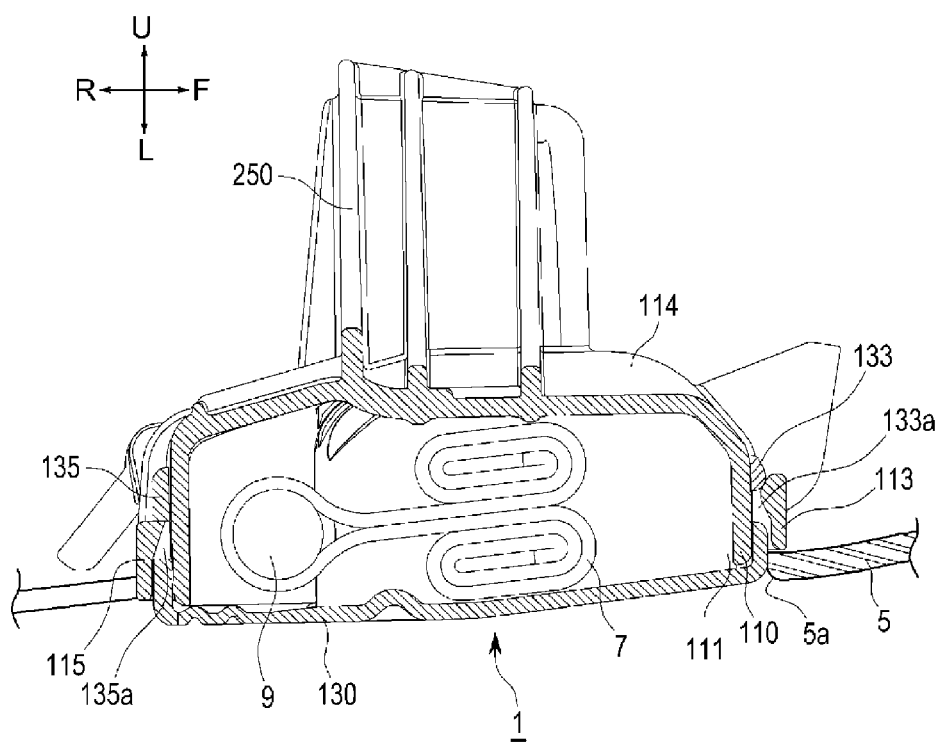
FIG. 2 is an enlarged view of a part marked by reference character II of FIG. 1.

FIG. 1 is a sectional view schematically showing a state that an airbag housing assembly is applied to a knee protection airbag device provided at the side of a driver seat according to an embodiment of the present invention, and FIG. 2 is an enlarged view of a part marked by reference character II of FIG. 1.

Referring to FIGS. 1 and 2, an airbag device 1 is installed under a steering column 3 located in the front of a driver (occupant) O to protect a knee K of the occupant O.

In other words, the airbag device 1 is installed in an opening 5a of a low instrument panel 5 located under the steering column 3 corresponding to the knee K of the occupant O.

The airbag device 1 includes an airbag 7, an inflator 9 supplying gas to the airbag 7 upon collision of the vehicle, and an airbag housing assembly 100 receiving the airbag 7 and the inflator 9. The airbag housing assembly 100 includes a housing 110 and a cover 130 covering a rear opening 111 of the housing 110.

In the airbag device 1, the airbag 7, the inflator 9, the housing 110, and the cover 130 are integrated with each other to constitute one module. As shown in FIGS. 1 and 2, the inflator 9 may be received inside the housing 110. Alternatively, the inflator 9 may be coupled with an outer portion of the housing 11.

The airbag device 1 is supported on a cowl cross bar 12 installed in the width direction of the vehicle through a coupling device 200.

The airbag 7 is made of a woven cloth sewn in a wide rectangular shape when viewed from the side of the occupant O. The airbag 7 is folded and received inside the housing 110. When the airbag 7 is deployed, the cover 130 is pushed and opened due to an inflation force of the airbag 7, and the airbag 7 is discharged from the housing 110 through an open gap, and deployed in the rearward direction of the vehicle. Subsequently, the airbag 7 is inflated upward between the low instrument panel 5 and the knee K of the occupant O to protect the knee K of the occupant O.

The cover 130 has a wide rectangular shape when viewed from the side of the occupant O and includes resin. The cover 130 is coupled with the housing 110 to cover the opening 111 of the housing 110, and covers the opening 5a of the low instrument panel 5.

A plurality of front and rear hooks 113 and 115 are formed at front and rear edges of the housing 110, and a plurality of locking members 133 and 135 having front and rear hook holes 133a and 135a fitted around the front and rear hooks 113 and 115 are formed at front and rear edges of the cover 130, respectively.

The front hook hole 133a of the cover 130 is easily separated from the front hook 113 due to the inflation force of the airbag 7 when the airbag 7 is deployed, and the rear hook hole 135a is not separated from the rear hook 115. Accordingly, the cover 130 is deployed in the lower direction when the airbag 7 is deployed. The cover 130 is made of flexible resin, so that the cover 130 is easily tilted in the lower direction when the cover 130 is opened.

Figure 3:
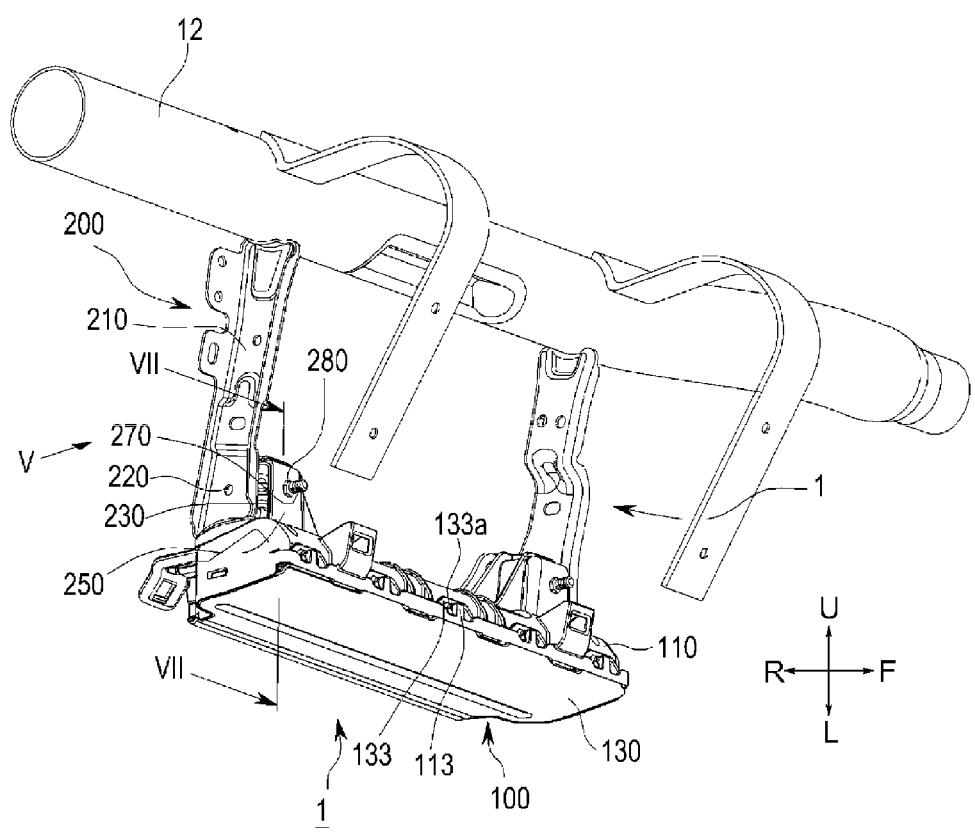
FIG. 3 is a perspective view showing a safety apparatus for a vehicle according to one embodiment of the present invention.
Figure 4:
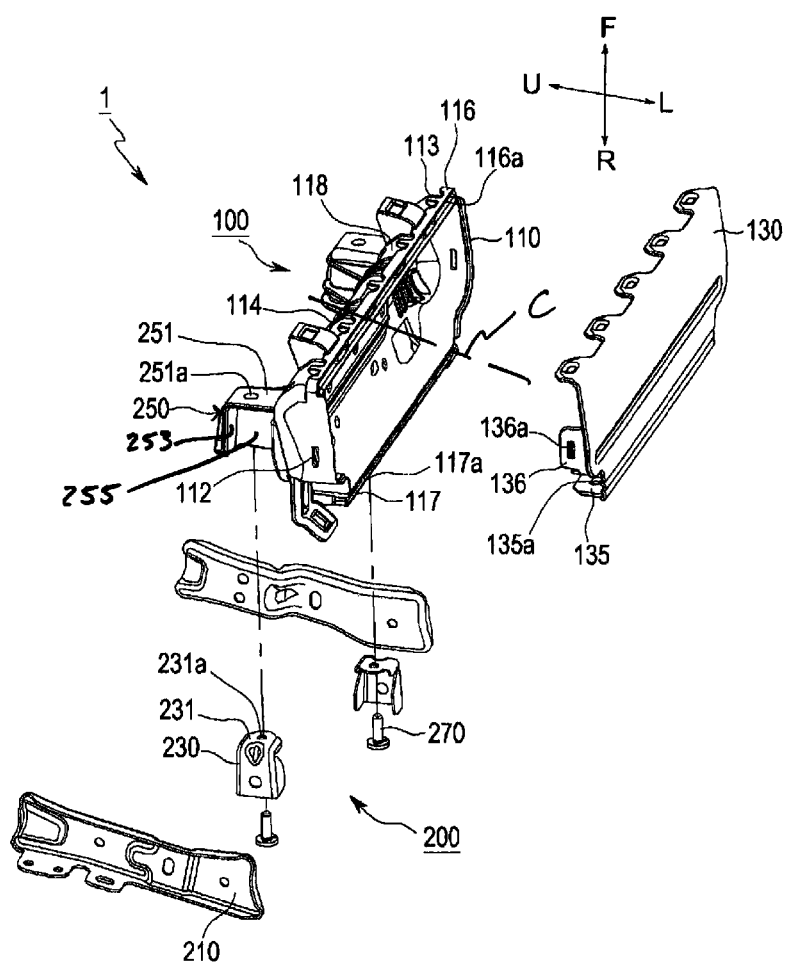
FIG. 4 is an exploded perspective view showing a part of the safety apparatus for the vehicle of FIG. 3.
Figure 5:
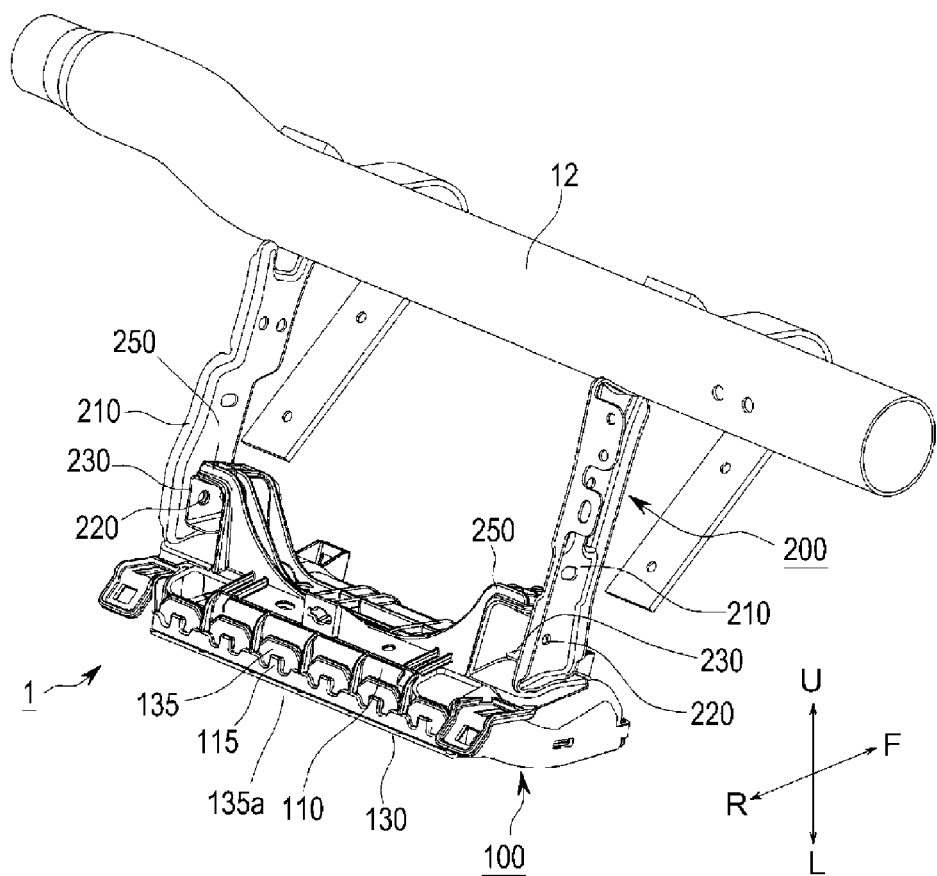
FIG. 5 is a perspective view showing the safety apparatus for the vehicle when viewed along an arrow V of FIG. 3.
Figure 6:
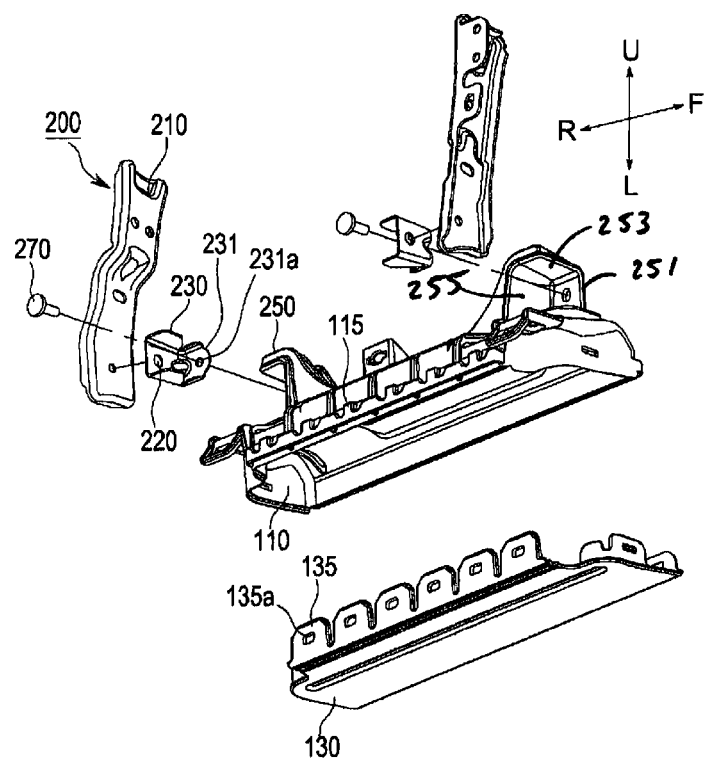
FIG. 6 is an exploded perspective view showing a part of the safety apparatus for the vehicle of FIG. 5.

FIG. 3 is a perspective view showing a safety apparatus for a vehicle according to one embodiment of the present invention, and FIG. 4 is an exploded perspective view showing a part of the safety apparatus for the vehicle of FIG. 3. FIG. 5 is a perspective view showing the safety apparatus for the vehicle when viewed along an arrow V of FIG. 3, and FIG. 6 is an exploded perspective view showing a part of the safety apparatus for the vehicle of FIG. 5.

Referring to FIGS. 3 to 6, the coupling device 200 for the airbag device 1 includes a plurality of mounting brackets 210 provided on the cowl cross bar 12 while being spaced apart from each other, mounting blocks 230 coupled with distal ends of the mounting brackets 210, and fitting members 250 provided on an upper outer surface of the housing 110 so that the fitting members 250 are fitted on the mounting blocks 230.

The mounting block 230 is provided inside the mounting bracket 210, and the fitting member 250 is positioned on the upper outer surface of the housing 110 corresponding to the mounting block 230.

The mounting block 230 may be coupled with the mounting bracket 210 through various coupling members 220 (e.g., welding units, rivets, and bolts).

The mounting blocks 230 are coupled with the inner portions of the mounting brackets 210 while facing each other. The fitting members 250 are positioned corresponding to the mounting blocks 230, and the rear portions of the fitting members 250 and the side portions of the fitting members 250 provided in parallel to both lengthwise lateral sides of the housing 110 are opened.

The coupling position of the mounting block 230 is not limited to the inner portions of the mounting bracket 210, but the coupling position of the mounting block 230 may be variously changed. In this case, the coupling position of the fitting member 250 follows the changed coupling position of the mounting block 230.

A protrusion 270 protrudes from a front surface 231 of the mounting block 230, and the fitting member 250 is provided in the front surface 251 thereof with a through hole 251a fitted around the protrusion 270. The protrusion 270 includes a bolt. Accordingly, the bolt may be inserted into the through hole 253 and then a nut 280 may be tightened. Preferably, after the protrusion 270 has been inserted into the through hole 251a formed in the front surface 251 of the fitting member 250, the protrusion 270 is coupled such that the protrusion 270 is separated from the fitting member 250.

The fitting member 250 may be injection-molded by using a resin material so that the fitting member 250 is integrally formed with the housing 110.

The mounting bracket 210 and the mounting block 230 may include a metallic material representing high strength.

A support member preliminarily supports the airbag device 1 on the mounting bracket 210 so that the airbag device 1 is easily coupled with the cowl cross bar 12. Accordingly, the support member is not limited to the fitting member 250 fitted on the mounting block 230 as described above. For example, the mounting block 230 may be formed therein with a hole, and the support member may be inserted into the hole to preliminarily support the airbag device. In other words, the support member may be variously modified.

Figure 7:
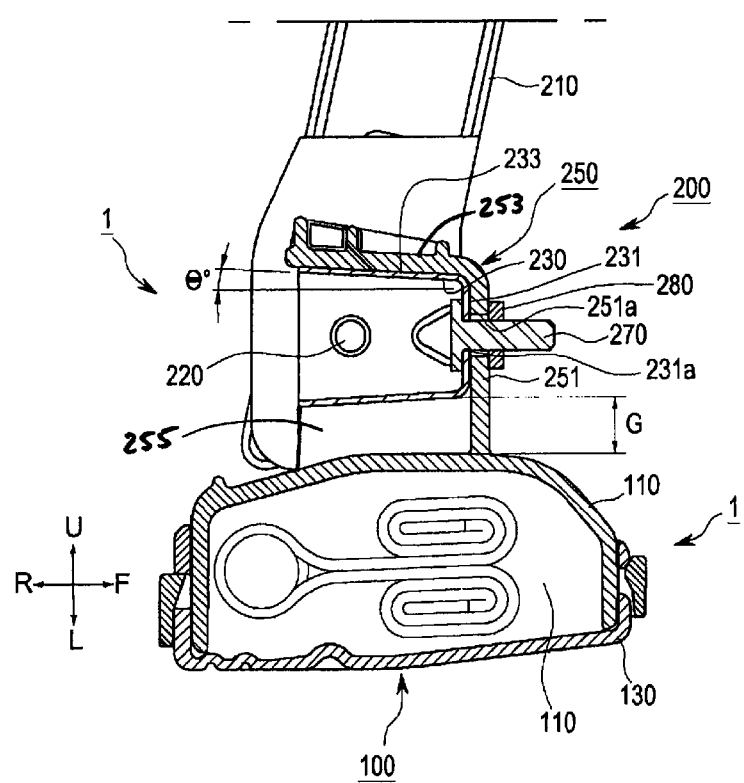
FIG. 7 is a sectional view taken along line VII-VII of FIG. 3.
Figure 8:
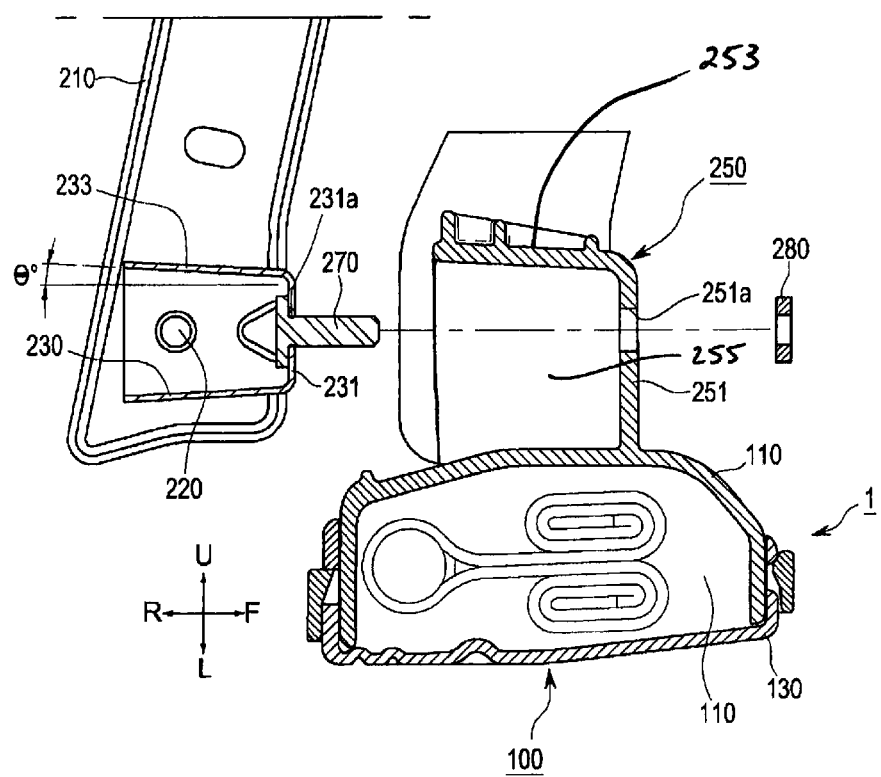
FIG. 8 is a sectional view taken along line VIII-VIII of FIGS. 4.

FIG. 7 is a sectional view taken along line VII-VII of FIG. 3, and FIG. 8 is a sectional view taken along line VIII-VIII of FIG. 4.

Referring to FIGS. 7 and 8, at least one upper side 233 of the mounting block 230 becomes inclined at a predetermined angle θ° in the forward direction F while facing the inner portion of the mounting block 230, and an upper side 253 of the fitting member 250 corresponding to the upper side 233 of the mounting block 230 may be inclined in the forward direction F of the fitting member 250 while facing the inner portion of the fitting member 250. Accordingly, the fitting member 250 can be easily fitted on the mounting block 230 through the above structure. Each of the fitting members 250 includes a front side 251 protruding upward from an upper outer surface of the housing 110, the upper side 253 extending from an upper end of the front side 231, and a lateral side 255 connected to inner ends of the front and upper sides 251 and 253 directed to an upper-lower central axis C, and extending from the upper outer surface of the housing 110.

In addition, the length of an outer peripheral surface of the mounting block 230 is shorter than the length of an inner peripheral surface of the fitting member 250, so that the fitting member 250 can be easily fitted on the mounting block 230. That is to say, in the state that the outer peripheral surface of the mounting block 230 is coupled with the inner peripheral surface of the fitting member 250, a predetermined gap G is formed between the outer peripheral surface of the mounting block 230 and the inner peripheral surface of the fitting member 250.

Hereinafter, a work of coupling the airbag device 1 with the cowl cross bar 12 by the coupling device 200 and the coupling operation thereof will be described.

First, the inflator 9 is coupled with the inner portion or the outer portion of the housing 110, and the airbag 7 is folded and received in the housing 10 in the state that the airbag 7 is connected to the inflator 9. Then, the front and rear locking members 133 and 135 provided at the front and rear edges of the cover 130 are pushed toward the front and rear hooks 113 and 115 provided at the front and rear portions of the housing 110, so that the front and rear hook holes 133a and 135a formed in the front and rear locking members 133 and 135 are coupled with the front and rear hooks 113 and 115.

As described above, the inflator 9, the airbag 7, the housing 110, and the cover 130 are integrally coupled with each other to constitute the airbag device 1 in the form of a single assembly.

The mounting block 230 is coupled with the inner portion of the mounting bracket 210 through the coupling member 220. The protrusion 270 is inserted into the mounting hole 231a formed in the front surface 231 of the mounting block 230 so that the protrusion 270 stands by in the fixed state without deviating from the front surface of the mounting block 230.

In this state, the airbag device 1 is moved to the mounting bracket 210. Thereafter, the fitting member 250 provided on the upper outer surface of the housing 110 is fitted on the outer portion of the mounting block 230. Accordingly, the through hole 251a of the fitting member 250 is fitted around the protrusion 270 provided on the front surface 231 of the mounting block 230.

In this case, the lateral side 233 of the mounting block 230 is inclined at the predetermined angle θ°, and the inner surface 253 of the fitting member 250 corresponding to the lateral side 233 is inclined at the predetermined angle θ°, so that the mounting block 230 can be easily inserted into the fitting member 250. Meanwhile, a predetermined gap G is formed between the outer surface of the mounting block 230 and the inner surface of the fitting member 250, so that the fitting member 250 can be easily fitted on the mounting block 230.

When the airbag 1 is interposed between the mounting brackets 210 by the mounting block 230 and the fitting member 250, a worker couples the nut 280 with the outer portion of the protrusion 270, so that the airbag device 1 is firmly coupled with the mounting bracket 210.

In this case, as both sides of the airbag device 1 are supported through the fitting members 250 and the mounting blocks 230, a worker can easily carry out a coupling work without supporting the airbag device 1 with one hand when tightening the nut 280.

As described above, since the front surface 251 and the inner surface 253 of the fitting member 250 are supported by the front surface 231 and the lateral side 233 (see FIG. 3) of the mounting block 230, the airbag device 1 having the above coupling structure can be more firmly supported on the cowl cross bar 12.

Therefore, the airbag device 1 can be prevented from deviating from a proper position thereof due to the inflation force of the airbag when the airbag device 1 is operated, so that the airbag 7 can be safely deployed.

Meanwhile, the airbag device 1 is firmly supported when the airbag device 1 is operated, thereby preventing the instrument panel 5 from being deformed or broken. In addition, the airbag device 1 is firmly supported, so that the NVH may be reduced.

Figure 9:
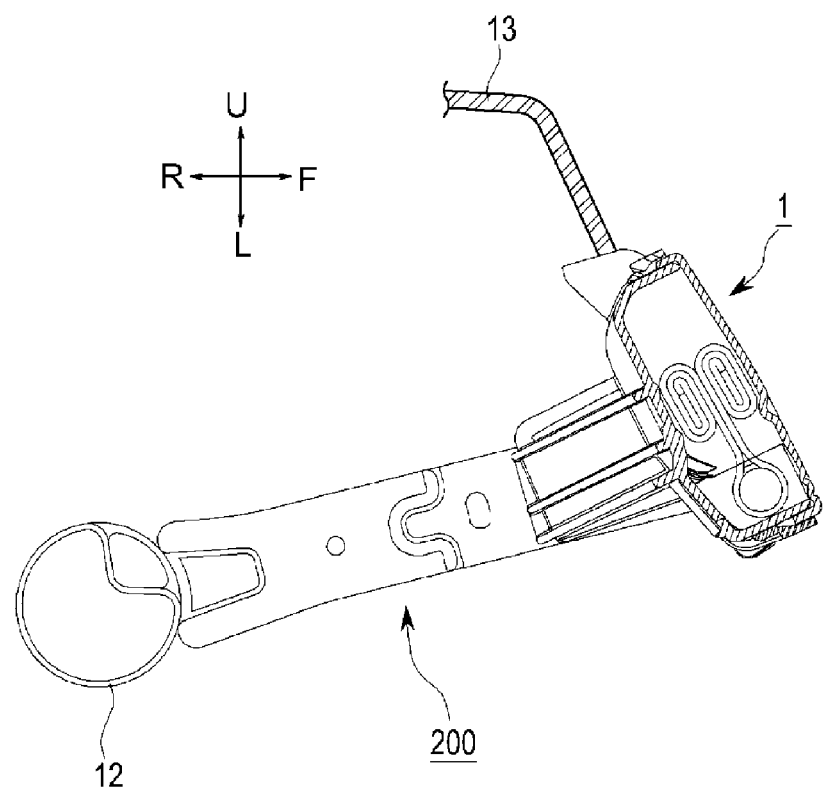
FIG. 9 is a sectional view showing an airbag device according to one embodiment of the present invention provided in an instrument panel provided at a passenger seat.

FIG. 9 is a sectional view showing the airbag device according to one embodiment of the present invention which is provided in the instrument panel positioned at the side of the passenger seat.

Referring to FIG. 9, the airbag device 1 according to one embodiment of the present invention is provided in the instrument panel 6 at the side of the passenger seat to protect the upper body of the occupant O from the impact.

In the above description, the coupling device 200 coupling the airbag device 1 to the cowl cross bar 12 has been described.

However, the coupling device 200 according to one embodiment of the present invention is applicable to all buffer devices to buffer the impact applied to the knees of the occupant upon vehicle collision, in addition to the airbag device 1 including the airbag.

Although the exemplary embodiments of the present invention have been described, it is understood that the exemplary embodiments help one ordinary skilled in the art to easily realize the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A safety apparatus for a vehicle comprising:
an airbag device including a housing having an open side to receive a folded airbag, an inflator provided in the housing to supply inflation gas to the airbag, and a cover to close the open side of the housing; and
a coupling device coupling the airbag device to a cowl cross bar installed in a width direction of a vehicle, the coupling device including
a plurality of mounting brackets coupled with the cowl cross bar at predetermined distances, mounting blocks coupled with the mounting brackets, the coupling device further including support members provided on an upper outer surface of the housing and supported on the mounting blocks,
wherein the support members include fitting members fitted on the mounting blocks, at least one upper side of each mounting block inclined in a forward to rearward direction of the vehicle, and
wherein, an upper side of each fitted member corresponding to the at least one upper side of the mounting block is inclined in the forward to rearward direction of the vehicle.

2. The safety apparatus of claim 1, wherein the mounting blocks are coupled with inner portions of the mounting brackets while facing each other, and
wherein each of the fitting members includes a front side protruding upward from an upper outer surface of the housing, the upper side of the fitting member extending from an upper end of the front side, and a lateral side connected to inner ends of the front and upper sides directed to an upper-lower central axis, and extending from the upper outer surface of the housing.

3. The safety apparatus of claim 2, wherein the airbag device is provided in an opening of a low instrument panel positioned under a steering column provided at a side of a driver seat of the vehicle, and the cover is directed to a floor of the vehicle.

4. The safety apparatus of claim 2, wherein each mounting block is provided on a mounting block surface with a protrusion, and each fitting member is provided in a front surface thereof with a through hole fitted around the protrusion.

5. The safety apparatus of claim 4, wherein the protrusion of the mounting block includes a bolt, the through hole is fitted around the protrusion, and then a nut is coupled with the bolt.

6. The safety apparatus of claim 4, wherein the airbag device is provided in an opening of a low instrument panel positioned under a steering column provided at a side of a driver seat of the vehicle, and the cover is directed to a floor of the vehicle.

7. The safety apparatus of claim 1, wherein each fitting member and each mounting block are configured such that a predetermined interval is maintained between an inner surface of the fitting member and an outer surface of the mounting block.

8. The safety apparatus of claim 7, wherein the airbag device is provided in an opening of a low instrument panel positioned under a steering column provided at a side of a driver seat of the vehicle, and the cover is directed to a floor of the vehicle.

9. The safety apparatus of claim 1, wherein each fitting member is injection-molded such that the fitting member is integrally formed with the housing.

10. The safety apparatus of claim 9, wherein the airbag device is provided in an opening of a low instrument panel positioned under a steering column provided at a side of a driver seat of the vehicle, and the cover is directed to a floor of the vehicle.

11. The safety apparatus of claim 1, wherein the airbag device is provided in an opening of a low instrument panel positioned under a steering column provided at a side of a driver seat of the vehicle, and the cover is directed to a floor of the vehicle.

12. The safety apparatus of claim 1, wherein the airbag device is provided in an opening of an upper instrument panel provided at a side of a passenger seat of the vehicle.

13. A safety apparatus for a vehicle comprising:
an airbag device including a housing having an open side to receive a folded airbag, an inflator provided in the housing to supply inflation gas to the airbag, and a cover to close the open side of the housing; and a coupling device for coupling the airbag device to a cowl cross bar installed in a width direction of a vehicle, the coupling device including:

first and second mounting brackets for coupling with the cowl cross bar at spaced apart locations;

first and second mounting blocks coupled with the first and second mounting brackets, respectively, at least one upper side of each mounting block inclined in a forward to rearward direction of the vehicle; and first and second support members provided on respective upper outer surfaces of the housing and supported on the first and second mounting blocks, respectively, the first and second support members each including fitting members fitted on a respective one of the first and second mounting blocks, an upper side of each fitting member corresponding to the at least one upper side of the respective one of the first and second mounting blocks and inclined I the forward to rearward direction of the vehicle.

14. The safety apparatus of claim 13, wherein the first and second mounting blocks are coupled with distal ends of the first and second mounting brackets, respectively.

15. The safety apparatus of claim 13, wherein the first and second fitting members are integrally formed with the housing.

16. The safety apparatus of claim 13, wherein each mounting block is provided on a mounting block surface with a protrusion, and each fitting member is provided in a front surface thereof with a through hole fitted around the protrusion.

17. The safety apparatus of claim 16, wherein the protrusion of the mounting block includes a bolt, the through hole is fitted around the protrusion, and then a nut is coupled with the bolt.

18. The safety apparatus of claim 13, in combination with the vehicle.

19. The safety apparatus of claim 13, wherein the first and second fitting members are formed with the housing and the first and second mounting blocks are independently formed from the housing and the first and second mounting brackets.

20. The safety apparatus of claim 13, wherein the first and second mounting brackets are laterally outboard from the first and second fitting members of the housing and the first and second mounting blocks are laterally between the housing and the first and second mounting brackets, respectively.

* * * * *